US012169681B2

United States Patent
Shirani et al.

(10) Patent No.: US 12,169,681 B2
(45) Date of Patent: Dec. 17, 2024

(54) CONTEXT-AWARE FONT RECOMMENDATION FROM TEXT

(71) Applicant: Adobe Inc., San Jose, CA (US)

(72) Inventors: Amirreza Shirani, Cupertino, CA (US); Franck Dernoncourt, San Jose, CA (US); Jose Ignacio Echevarria Vallespi, Belmont, CA (US); Paul Asente, Redwood City, CA (US); Nedim Lipka, Campbell, CA (US); Thamar I. Solorio Martinez, Cypress, TX (US)

(73) Assignee: Adobe Inc., San Jose, CA (US)

( * ) Notice: Subject to any disclaimer, the term of this patent is extended or adjusted under 35 U.S.C. 154(b) by 131 days.

(21) Appl. No.: 17/489,474

(22) Filed: Sep. 29, 2021

(65) Prior Publication Data

US 2022/0358280 A1   Nov. 10, 2022

Related U.S. Application Data

(60) Provisional application No. 63/184,182, filed on May 4, 2021.

(51) Int. Cl.
*G06F 40/109* (2020.01)
*G06F 40/169* (2020.01)
*G06N 3/02* (2006.01)

(52) U.S. Cl.
CPC .......... *G06F 40/109* (2020.01); *G06F 40/169* (2020.01); *G06N 3/02* (2013.01)

(58) Field of Classification Search
CPC ......... G06F 40/109; G06F 40/169; G06F 3/02
See application file for complete search history.

(56) References Cited

U.S. PATENT DOCUMENTS

| | | | |
|---|---|---|---|
| 5,586,242 A | 12/1996 | McQueen et al. | |
| 10,970,458 B1 | 4/2021 | Dhanuka et al. | |
| 11,157,693 B2 | 10/2021 | Srinivasan et al. | |
| 11,422,996 B1 | 8/2022 | Muhlstein et al. | |
| 11,423,072 B1 | 8/2022 | Chen et al. | |
| 11,508,392 B1 | 11/2022 | Sohail et al. | |
| 2005/0075880 A1 | 4/2005 | Pickover et al. | |

(Continued)

FOREIGN PATENT DOCUMENTS

CN    112800190 A    5/2021

OTHER PUBLICATIONS

Alonso, O., et al., "Crowdsourcing a Subjective Labeling Task: A Human-Centered Framework to Ensure Reliable Results", Microsoft Res., Redmond, 2014, 10 pages.

(Continued)

*Primary Examiner* — Kyle R Stork
(74) *Attorney, Agent, or Firm* — Nicholson De Vos Webster & Elliott LLP

(57) ABSTRACT

Embodiments are disclosed for recommending fonts based on text inputs are described. In some embodiments, a method of recommending fonts includes receiving a selection of text, providing a representation of the selection of text to a font recommendation model, generating, by the font recommendation model, a prediction score for each of a plurality of fonts based on the representation of the selection of text, and returning at least one recommended font based on the prediction score for each of the plurality of fonts.

20 Claims, 11 Drawing Sheets

(56) References Cited

U.S. PATENT DOCUMENTS

| | | | |
|---|---|---|---|
| 2019/0080347 A1* | 3/2019 | Smith | G06Q 30/0269 |
| 2019/0114318 A1 | 4/2019 | Zhou et al. | |
| 2019/0392325 A1 | 12/2019 | Lange et al. | |
| 2020/0073936 A1* | 3/2020 | Jankowski | G06F 40/279 |
| 2020/0163212 A1* | 5/2020 | Yashiro | H03H 9/059 |
| 2021/0117773 A1 | 4/2021 | Sollami et al. | |
| 2021/0141866 A1* | 5/2021 | Chen | G06F 40/30 |
| 2021/0209289 A1 | 7/2021 | Kandur et al. | |
| 2021/0334708 A1* | 10/2021 | Li | G06F 40/40 |
| 2021/0357187 A1 | 11/2021 | Clement et al. | |
| 2021/0374349 A1 | 12/2021 | Liu et al. | |
| 2022/0188520 A1 | 6/2022 | Iso-Sipila et al. | |
| 2022/0198144 A1* | 6/2022 | Yang | G06N 3/088 |
| 2022/0222432 A1 | 7/2022 | Meng et al. | |
| 2022/0222570 A1* | 7/2022 | Rout | G06F 16/221 |
| 2022/0253719 A1 | 8/2022 | Ramos et al. | |
| 2022/0284049 A1 | 9/2022 | Christensen et al. | |
| 2023/0016729 A1 | 1/2023 | Pouran et al. | |

OTHER PUBLICATIONS

Amare, N., et al., "Seeing Typeface Personality: Emotional Responses to Form as Tone", IEEE International Professional Communication Conference, Oct. 2012, 10 pages.

Barsoum, E., et al., "Training Deep Networks for Facial Expression Recognition with Crowd-Sourced Label Distribution", In Proceedings of the 18th ACM International Conference on Multimodal Interaction, Sep. 24, 2016, 6 pages.

Carneiro, G., et al., "Supervised Learning of Semantic Classes for Image Annotation and Retrieval", IEEE Transactions on Pattern Analysis and Machine Intelligence, vol. 29, No. 3, Mar. 2007, pp. 394-410.

Claude Coulombe, "Text data augmentation made simple by leveraging NLP cloud APIS", arXiv preprint arXiv:1812.04718, 2018, pp. 1-33.

Devlin, J., et al., "BERT: Pre-training of Deep Bidirectional Transformers for Language Understanding", Proceedings of NAACL-HLT, 2019, pp. 4171-4186.

Doyle, J. R., et al., "Dressed for the Occasion: Font-Product Congruity in the Perception of Logotype", Journal of Consumer Psychology, vol. 16, No. 2, 2006, pp. 112-123.

Eva R. Brumberger, "The Rhetoric of Typography: The Awareness and Impact of Typeface Appropriateness", Technical Communication, vol. 50, No. 2, May 2003, pp. 224-231.

Eva R. Brumberger, "The Rhetoric of Typography: The persona of typeface and text", Technical Communication, vol. 50, No. 2, May 2003, pp. 206-223.

Felbo, B., et al., "Using millions of emoji occurrences to learn any-domain representations for detecting sentiment, emotion and sarcasm", arXiv:1708.00524v, Oct. 7, 2017, 13 pages.

Final Office Action, U.S. Appl. No. 17/534,937, Mar. 2, 2023, 17 pages.

Gao, T., et al., "SimCSE: Simple Contrastive Learning of Sentence Embeddings", Computer Science, May 18, 2022, 17 pages.

Geng, X., et al., "Facial Age Estimation by Learning from Label Distributions", IEEE Transactions on Pattern Analysis and Machine Intelligence, vol. 35, No. 10, Oct. 2013, pp. 451-456.

Greene, D., et al., "Using Crowdsourcing and Active Learning to Track Sentiment in Online Media", Research Gate, Jan. 2010, 13 pages.

Henderson, P. W., et al., "Impression Management Using Typeface Design", Conditional Acceptance at the Journal of Marketing, Ms 02-168, Apr. 2004, 36 pages.

Jo Mackiewicz, "Audience Perceptions of Fonts in Projected PowerPoint Text Slides", Technical Communication, vol. 54, No. 3, Aug. 2007, pp. 295-307.

Joseph L. Fleiss, "Measuring Nominal Scale Agreement Among Many Raters", Psychological Bulletin, vol. 76, No. 5, 1971, pp. 378-382.

Juni, S., et al., "Emotional and persuasive perception of fonts", Perceptual and Motor Skills, vol. 106, No. 1, 2008, pp. 35-42.

Kar, S., et al., "Folksonomication: Predicting Tags for Movies from Plot Synopses Using Emotion Flow Encoded Neural Network", In Proceedings of the 27th International Conference on Computational Linguistics, Aug. 15, 2018, 13 pages.

Kingma, D. P., et al., "Adam: A method for stochastic optimization", arXiv:1412.6980v9, Jan. 30, 2017, pp. 1-15.

Kulahcioglu, T., et al., "FontLex: A Typographical Lexicon based on Affective Associations", In Proceedings of the Eleventh International Conference on Language Resources and Evaluation, 2018, pp. 62-69.

Kullback, S., et al., "On Information and Sufficiency", The Annals of Mathematical Statistics, vol. 22, No. 1, Mar. 1951, pp. 79-86.

Mackiewicz, J., et al., "Why People Perceive Typefaces to Have Different Personalities", International Professional Communication Conference, 2004. IPCC 2004. Proceedings, 2004, pp. 304-313.

Mallinson, J., et al., "Paraphrasing Revisited with Neural Machine Translation", Proceedings of the 15th Conference of the European Chapter of the Association for Computational Linguistics, vol. 1, 2017, pp. 881-893.

Mohammad, S. M., et al., "Crowdsourcing a Word-Emotion Association Lexicon", Computational Intelligence, vol. 29, No. 3, Aug. 2013, pp. 1-25.

Nguyen, A. T., et al., "Probabilistic Modeling for Crowdsourcing Partially-Subjective Ratings", Proceedings of the AAAI Conference on Human Computation and Crowdsourcing, vol. 4, 2016, pp. 149-158.

Non-Final Office Action, U.S. Appl. No. 17/534,937, Oct. 17, 2022, 15 pages.

O'Donovan, P., et al., "Exploratory Font Selection Using Crowdsourced Attributes", ACM Transactions on Graphics, vol. 33, No. 4, Article No. 92, Jul. 27, 2014, pp. 1-9.

Pennington, J., et al., "GloVe: Global Vectors for Word Representation", Proceedings of the 2014 conference on empirical methods in natural language processing (EMNLP), 2014, pp. 1532-1543.

Reimers, N., et al., "Sentence-BERT: Sentence Embeddings using Siamese BERT-Networks", Computer Science, Aug. 27, 2019, 11 pages.

Ren et al., "Intention Detection Based on Siamese Neural Network With Triplet Loss", IEEE Access, vol. 8, Apr. 2020, pp. 82242-82254.

Rodrigues, F., et al., "Sequence Labeling with Multiple Annotators", Machine Learning, vol. 95, No. 2, Oct. 4, 2013, pp. 165-181.

Saif, M. Mohammad, "Obtaining Reliable Human Ratings of Valence, Arousal, and Dominance for 20,000 English Words", Proceedings of the 56th Annual Meeting of the Association for Computational Linguistics, vol. 1, 2018, pp. 174-184.

Saif, M. Mohammad, "Word Affect Intensities", Proceedings of the 11th Edition of the Language Re-sources and Evaluation Conference (LREC-2018), 2018, pp. 174-183.

Salminen, J. O., et al., "Inter-Rater Agreement for Social Computing Studies", In 2018 Fifth International Conference on Social Networks Analysis, Management and Security (SNAMS), 2018, 9 pages.

Shinahara, Y., et al., Serif or Sans: Visual Font Analytics on Book Covers and Online Advertisements, International Conference on Document Analysis and Recognition (ICDAR), 2019, 6 pages.

Shirani, A., et al., "Learning Emphasis Selection for Written Text in Visual Media from Crowd-Sourced Label Distributions", Proceedings of the 57th Annual Meeting of the Association for Computational Linguistics, 2019, pp. 1167-1172.

Shirani, A., et al., "Let me Choose: From Verbal Context to Font Selection", Computer Science, 2020, pp. 8607-8613.

Srinivasan, R., et al., "Crowdsourcing in the Absence of Ground Truth—A Case Study", Computer Science, 2019, 7 pages.

Urkullu, A., et al., "On the evaluation and selection of classifier learning algorithms with crowdsourced data", Applied Soft Computing, vol. 80, 2019, pp. 832-844.

Wolf, T., et al., "Transformers: State-of-the-Art Natural Language Processing", Proceedings of the 2020 Conference on Empirical Methods in Natural Language Processing: System Demonstrations, 2020, pp. 38-45.

(56) References Cited

OTHER PUBLICATIONS

Xin Geng., "Label distribution learning", IEEE Transactions on Knowledge and Data Engineering, vol. 28, No. 7, 2016, pp. 1-14.
Yang, J., et al., "Leveraging Crowdsourcing Data for Deep Active Learning An Application: Learning Intents in Alexa", Proceedings of the 2018 World Wide Web Conference, 2018, pp. 23-32.
Yang, X., et al., "Deep Label Distribution Learning for Apparent Age Estimation", In Proceedings of the IEEE international conference on computer vision workshops, 2015, 7 pages.
Notice of Allowance, U.S. Appl. No. 17/534,937, Jun. 12, 2023, 8 pages.

* cited by examiner

Keep Calm and Visit London

25% OFF EVERYTHING ONLINE AND IN-STORE

Donut love

Enjoy the Last Bit of Summer!

Money Management

The Ultimate Carrot Cake

EMPIRE STATE OF MIND

FIG. 5

F0: Let's ring in the new year together!

F1: LET'S RING IN THE NEW YEAR TOGETHER!

F2: Let's ring in the new year together!

F3: *Let's ring in the new year together!*

F4: *Let's ring in the new year together!*

F5: Let's ring in the new year together!

F6: LET'S RING IN THE NEW YEAR TOGETHER!

F7: *Let's ring in the new year together!*

F8: Let's ring in the new year together!

F9: Let's ring in the new year together!

*FIG. 6*

CONTEXT-AWARE FONT RECOMMENDATION FROM TEXT

CROSS-REFERENCE TO RELATED APPLICATIONS

This application claims the benefit of U.S. Provisional Application No. 63/184,182, filed May 4, 2021, which is hereby incorporated by reference.

BACKGROUND

In visual designs, textual information requires the use of fonts with different properties. Whether it is books, magazines, flyers, ads, or social media posts, different typefaces are commonly used to express non-verbal information and add more dimensions to the text. An appropriate font usually embodies information about character, context, and usage of design. This has led to efforts to assist users in selecting fonts. Existing font selection systems typically assist users in selecting fonts by taking into account font similarity. However, these systems do not consider the verbal context of the input text, leaving it up to the user to identify the font they believe most appropriate for their content. Additionally, some previous techniques have attempted to recommend a font based on surrounding visual context of the text. However, this visual context is not always available, or the text may be the only visual component of a document. In such cases, the prior techniques are unable to provide a useful recommendation as there is no surrounding context on which to base the recommendation.

These and other problems exist with regard to font recommendation in electronic systems.

SUMMARY

Introduced here are techniques/technologies that provide a font recommendation from text. For example, in some embodiments, a font recommendation system receives a selection of text, this may be selected from an electronic document, file, or other text source. The font recommendation system includes a font recommendation model that recommends a font for the selected text. The selection of text may be processed by a pretrained model to generate a text embedding. The text embedding may be a representation of the selection of text that captures the features of the text, such as the emotional content of the text. Because the emotion conveyed by text is closely related to the font or fonts that are perceived as most appropriate for the text, this embedding can be used by a font recommendation model to recommend an appropriate font for the selected text. This enables fonts to be recommended based just on a text input, without relying on any other contextual information associated with the text, such as images, colors, or other properties of the document from which the text was selected. Font selection is an inherently subjective task. At training time, a label distribution learning technique is used to account for the subjectivity of the task.

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The detailed description is described with reference to the accompanying drawings in which:

FIG. 5 illustrates an example of a font dataset in accordance with one or more embodiments;

FIG. 6 illustrates an example of a text sample in different fonts for labeling in accordance with one or more embodiments;

DETAILED DESCRIPTION

One or more embodiments include techniques for recommending a font based on the text to which it is to be applied. For example, a machine learning model is trained to learn associations between the visual attributes of fonts and the verbal context of the texts they are typically applied to. The verbal context may include the emotion conveyed by the text, the perceived tone of the text, the sentiment of the text, or other information that is inferred from the text itself which affects how the text is understood as may be identified using various natural language understanding techniques. Once trained, the model can recommend fonts to be used for arbitrary text inputs. This allows for embodiment to rely on the text itself, rather than visual context, etc., to make a font recommendation.

Font-related studies have been explored in graphic design literature. For example, empirical studies have been performed on collections of book titles and online ads, showcasing trends relating typographic design and genre. Previous studies have also attempted to associate personality traits and fonts. These studies support the idea that typefaces may be perceived to have particular personas, emotions, or tones. More recently, some studies have found associations between fonts and words by utilizing font-emotion and word-emotion relationships. Instead of focusing on independent words, embodiments suggest fonts by considering the broader context of the whole text.

Embodiments provide a font recommendation system that can recommend a font based on the input text, without relying on additional information associated with the text, such as images, colors, or other properties of the document from which the text was selected. Additionally, the font recommendation system predicts a distribution of fonts. Usually, models are trained to find the top prediction for font recommendation. However, by explicitly learning a distribution, the font recommendation system can recommend the font that is the most congruent for an input text and also inform the user if multiple fonts might be equally useful, if there is a consensus, etc. For example, based on the label (font) distributions, embodiments can rank the fonts and show the user the top ones (e.g., top 3, top 5, top 10, or other number), or set a threshold (e.g., 0.5 or other value) and recommend all fonts that are higher the threshold. The final font can be selected automatically or interactively based on user input. This can even lead to suggesting if personalization makes sense or if a single font selection is suitable enough for a large audience.

Figure 1:
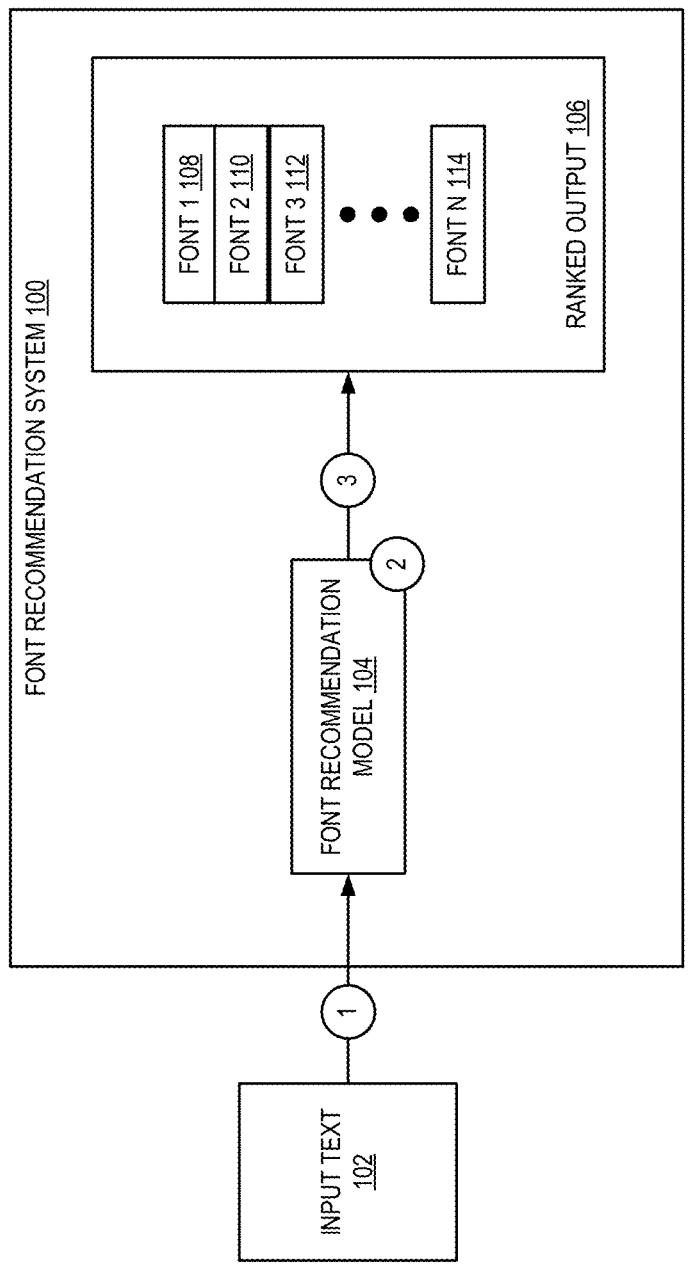
FIG. 1 illustrates a diagram of a process of font recommendation from text in accordance with one or more embodiments.

FIG. 1 illustrates a diagram of a process of font recommendation from text in accordance with one or more embodiments. As shown in FIG. 1, font recommendation system 100 can receive input text 102. For example, the font recommendation system may be implemented as part of a document management application, desktop publishing application, text editing application, etc. Alternatively, the font recommendation system may be implemented as a standalone system, or as part of a cloud suite of applications, which receives input text 102 from a document management application, desktop publishing application, text editing application, etc.

At numeral 1, the input text 102 is provided to font recommendation model 104. In some embodiments, the font recommendation model is a machine learning model, such as a neural network. A neural network may include a machine-learning model that can be tuned (e.g., trained) based on training input to approximate unknown functions. In particular, a neural network can include a model of interconnected digital neurons that communicate and learn to approximate complex functions and generate outputs based on a plurality of inputs provided to the model. For instance, the neural network includes one or more machine learning algorithms. In other words, a neural network is an algorithm that implements deep learning techniques, i.e., machine learning that utilizes a set of algorithms to attempt to model high-level abstractions in data.

In some embodiments, the font recommendation model 104 is trained using a training dataset in which text samples have been annotated with preferred fonts. The font recommendation model 104 may be trained on an annotated training dataset. In some embodiments, Kullback-Leibler Divergence (KL-DIV) is used as the loss function during training. This allows for the font recommendation model to learn label distributions (in particular, font distributions), which is useful when applied to a subjective task, such as font recommendation. During training, the font recommendation model 104 learns associations between visual attributes of fonts and the verbal context of the training texts. Once trained, the font recommendation model 104 is able to output a prediction for a plurality of fonts (e.g., a font distribution) which indicate how likely a given font is congruent or appropriate for arbitrary input text.

In some embodiments, the font recommendation model processes each input text 102 at numeral 2 to determine one or more fonts to recommend for the input text. The input text may include a phrase, sentence, sentence fragment, paragraph, or other quantity of text (e.g., more or less text). For example, given a piece of text X, the font recommendation system 100 determines which font(s) $y=\{y_0, \ldots y_g\}$ are more appropriate or congruent with the properties of the input text. This is formulated as a ranking problem where the font recommendation model 104 assigns each font a real value $d_y^x$, representing the degree to which y describes X. In other words, $d_y^x$ represents the degree of congruency of font y with input X. The values for all the labels are summed up to 1 to fully describe the instance.

In some embodiments, the model outputs a ranked list 106 of fonts at numeral 3. For example, the ranked list 106 includes fonts 1-N 108-114, ranked according to their corresponding prediction value from font recommendation model 104. In some embodiments, the font recommendation model first processes the input text 102 into a representation of the input text 102. For example, the input text may be passed through a pretrained model to obtain an embedding of the model. For example, a pretrained Bidirectional Encoder Representations from Transformers (BERT) sequence classification model (such as, but not limited to, the implementation described in Devlin et al., "Bert: Pre-training of deep bidirectional transformers for language understanding," 2018) can be used to obtain contextual embeddings which encode the verbal context of the text as features. Alternatively, a pretrained emoji model, such as, but not limited to, the Deep-Moji model described in Felbo et al., "Using millions of emoji occurrences to learn any domain representations for detecting sentiment, emotion, and sarcasm," published in Conference on Empirical Methods in Natural Language Processing, 2017) can generate emoji vectors by encoding the text into feature vectors (e.g., 2304-dimensional feature vectors). An emoji may include a pictogram, logogram, ideogram, smiley, etc. used in electronic communication to provide additional verbal context, such as additional emotional context, that may not be clearly conveyed through text alone. The emoji vectors may be the vectors generated prior to the last layer of the pretrained emoji model. These feature vectors may be treated as embeddings and then passed to the font representation model. In some embodiments, the font recommendation model includes a classification layer (e.g., one or more dense layers) which output the class predictions for the fonts.

Figure 2:
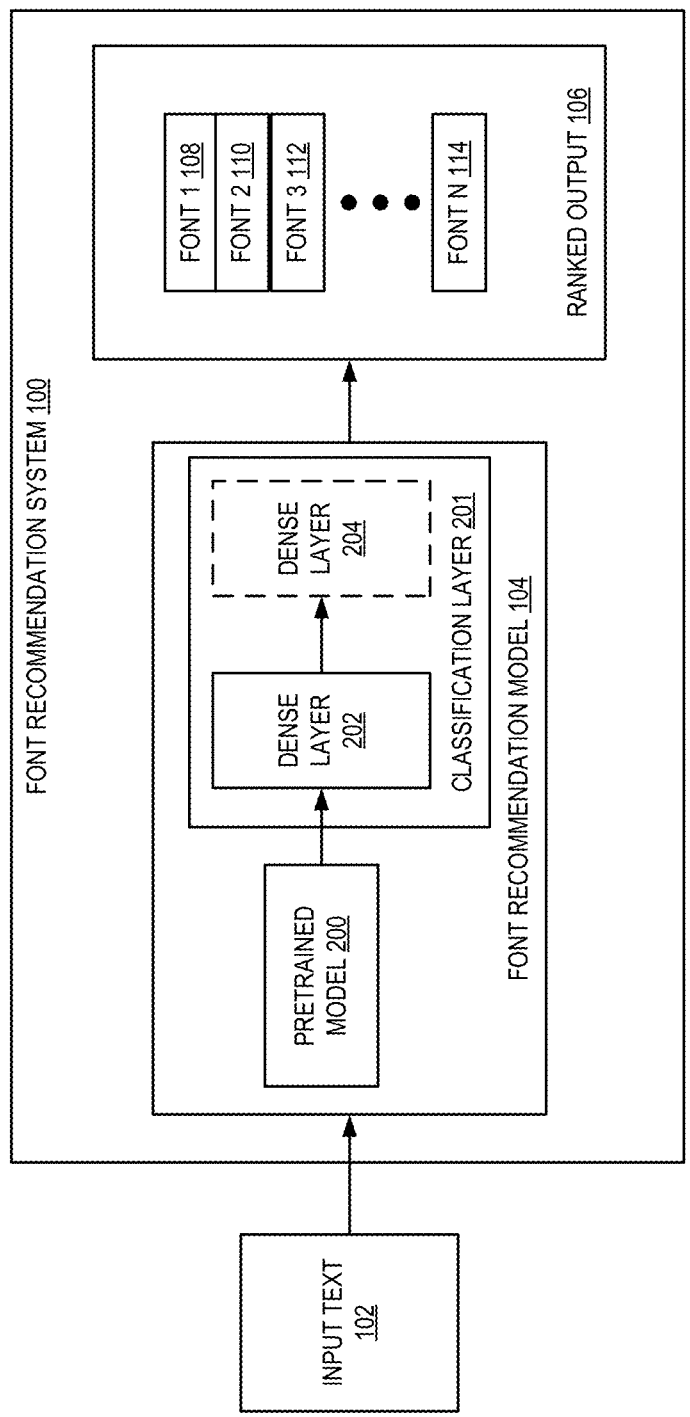
FIG. 2 illustrates a diagram of a font recommendation architecture in accordance with one or more embodiments.

FIG. 2 illustrates a diagram of a font recommendation architecture in accordance with one or more embodiments. As shown in FIG. 2, in some embodiments the font recommendation system implements a deep learning-based architecture of font recommendation model 104. As shown, the font recommendation model 104 may include two components: a pretrained model 200 and a classification layer 201, which may include one or more dense layers, such as dense layers 202 and 204. In this example, the font recommendation model 104 is implemented using two dense layers, however more or fewer dense layers may be used. As discussed, in some embodiments, the font recommendation model 104 may receive input text 102. The input text 102 may be first processed by the pretrained model 200. The pretrained model generates a text embedding that is a representation of the emotional features of the input text. This enables the font recommendation system 100 to leverage the relationships between fonts and emotions to recommend fonts more accurately for a given input text 102.

In some embodiments, the pretrained model 200 is a Global Vectors for Word Representations (GloVe)-bidirectional long short-term memory (BiLSTM) model. The GloVe model generates GloVe embeddings for the input text 102. The GloVe embeddings are a vector representation of words where semantically similar words are close to one another in vector space. These embeddings are then provided to a BiLSTM layer to encode word sequence information in forward and backward directions. The BiLSTM layer outputs encoded words which are then provided to font recommendation model, which may include one or more dense layers, such as dense layers 202 and 204, for prediction.

Alternatively, the pretrained model 200 is an NRC Model. NRC is an emotion lexicon, and the NRC model is a model trained based on this emotion lexicon. This NRC model identifies the emotional representations of words from various motion lexicons, such as NRC Emotion, Intensity, and Valence, Arousal, and Dominance (VAD). To efficiently look up the emotion value of words, embodiments search for the stemmed and synonym versions of out-of-vocabulary words. The emotion values of the words of the input text 102 are then combined and provided to the font recommendation model 104 which the predicts one or more fonts which correspond to the emotion values.

In some embodiments, the pretrained model may alternatively be a pretrained transformer-based model such as a Bidirectional Encoder Representations from Transformers (BERT) Model, such as the BERT sequence classification model. This outputs contextual embeddings for the input text 102 as features. As discussed, the contextual embeddings may be a representation of the verbal context of the text. The verbal context may include the emotion conveyed by the text, the perceived tone of the text, the sentiment of the text, or other information that is inferred from the text itself which affects how the text is understood as may be identified using, in this instance, a transformer-based model such as BERT. The contextual embeddings are provided to the font recommendation model 104 which outputs class predictions corresponding to fonts.

In some embodiments, the pretrained model 200 may be an emoji model, such as the DeepMoji pre-trained model. In such embodiments, the pretrained model 200 generates emoji vectors by encoding the text into feature vectors (e.g., in some embodiments, the emoji vectors may include 2304-dimensional vectors). These feature vectors are treated as embedding and are passed them to the font recommendation model. DeepMoji is a sentence-level model including rich representations of emotional content which is trained on a 1,246 million tweet corpus in the emoji prediction task.

Figure 3:
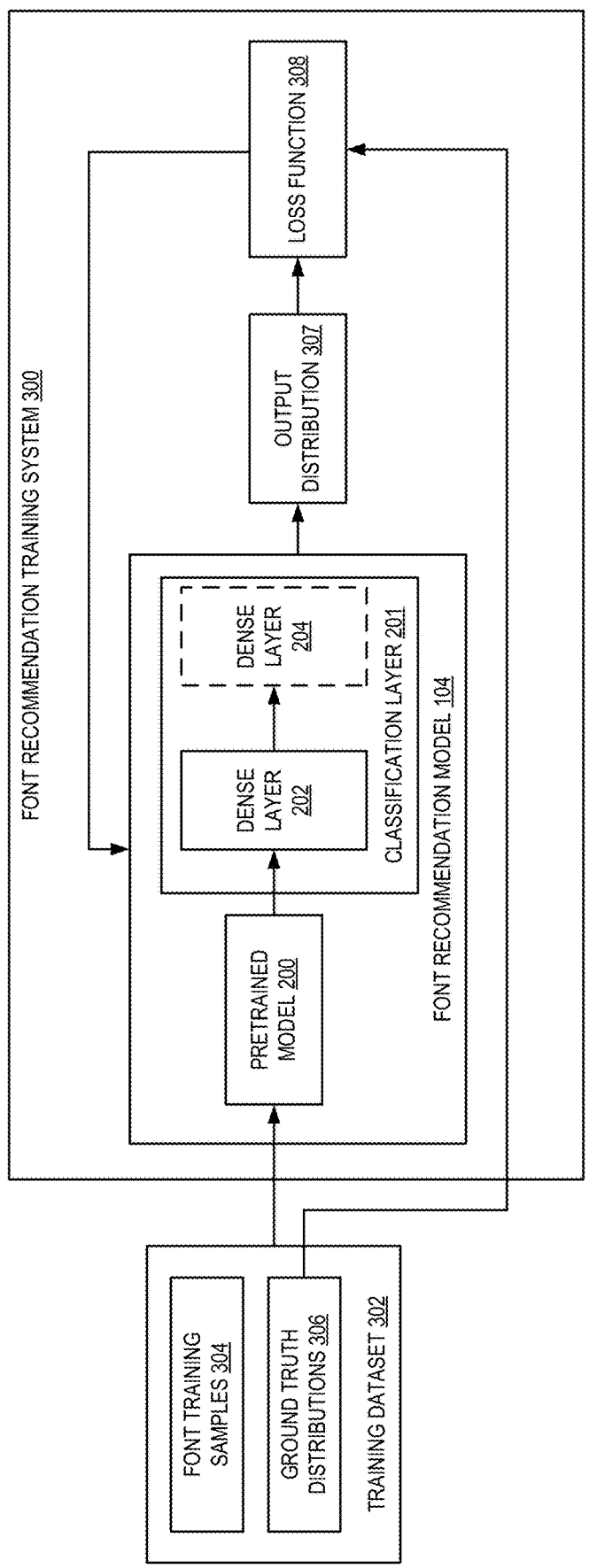
FIG. 3 illustrates a diagram of a process of training a font recommendation model in accordance with one or more embodiments.

FIG. 3 illustrates a diagram of a process of training a font recommendation model in accordance with one or more embodiments. As shown in FIG. 3, a font recommendation training system 300 can be used to teach, guide, tune, and/or train one or more neural networks. In some embodiments, font recommendation training system 300 may be implemented as part of font recommendation system or may be implemented as a separate system. For example, the font recommendation training system 300 may be tasked with training font recommendation model 104 to learn to predict how likely a given font is to be congruent with an input text. Once trained by the training system 300, the font recommendation model 104 can then be deployed to the font recommendation system 100 to be used for inference by end users.

In various embodiments, training may proceed similarly to inference, as described above. However, in training, a training dataset 302 which includes font training samples 304 and ground truth distributions 306 are used rather than arbitrary input texts. The training dataset may include short text instances corresponding to a variety of topics, such as those found in posters, flyers, motivational quotes, advertisements, etc. These text samples (e.g., font training samples 304) have been annotated with labels indicating the ranks assigned to different font choices for each text sample. These ranks are combined across multiple annotators for each sample to obtain ground truth distributions 306. Alternatively, the training dataset may include longer text instances (e.g., sentences, paragraphs, etc.) which may be annotated in a variety of different ways. The font recommendation training system 300 then trains the font recommendation model to predict a ranked distribution of suggested fonts that is close to the ground truth distribution.

Similar to inference, as discussed above, a font training sample (e.g., a text sample from a training dataset) is provided to font recommendation model 104. As discussed, the font training sample 304 may first be processed by pretrained model 200, which generates a text embedding that represents the emotional content of the input text. This embedding is then provided to one or more dense layers 202, 204 to generate an output distribution prediction 307. Although the example shown in FIG. 3 includes two dense layers, in various embodiments more or fewer dense layers may be used. This output font distribution is then provided to a loss function which compares the output font distribution 307 to a ground truth distribution 306 corresponding to the input font training sample. The font recommendation model 104 is then trained based on the difference between the ranked output and the ground truth distribution.

In some embodiments, the loss function 308 is the Kullback-Leibler Divergence (KL-DIV). KL-DIV measures how the predicted probability distribution is different from the ground truth probability distribution. In some embodiments, an Adam optimizer is used to optimize the model parameters based on the output of the loss function 308. In some embodiments, the font recommendation model is trained once the model has converged, or its performance has reached an adequate level (e.g., based on the model's prediction performance on a validation dataset which includes font samples not included in the training samples). In some embodiments, the font recommendation model may be considered trained after a set number of epochs. Once trained, the font recommendation model can be deployed to font recommendation system 100 for use on arbitrary text inputs.

Figure 4:
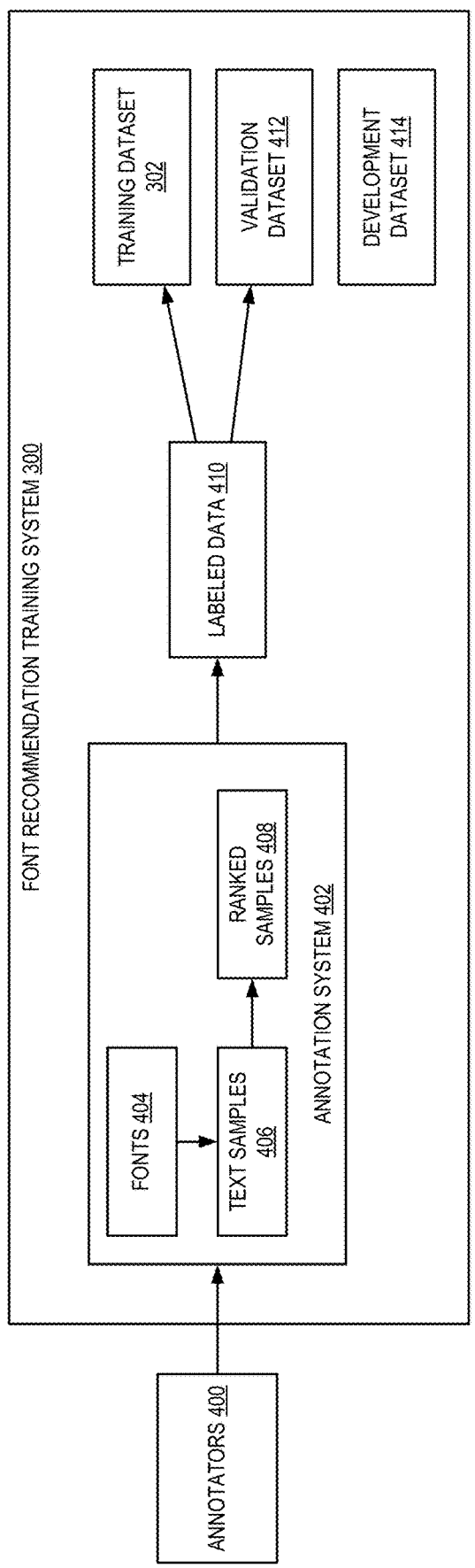
FIG. 4 illustrates a diagram of a process of generating a training dataset in accordance with one or more embodiments.

FIG. 4 illustrates a diagram of a process of generating a training dataset in accordance with one or more embodiments. As discussed, the font recommendation model is trained based on labeled text samples that have been labeled by annotators 400. In some embodiments, annotators 400 may include human annotators who interact with annotation system 402. Annotation system 402 may be implemented as part of font recommendation training system 300 or as a standalone system. In some embodiments, the annotation system 402 may be hosted by a cloud services provider and accessible through a web interface. This allows for the annotation system 402 to be accessed by a variety of users (e.g., annotators) who may be presented with an annotation task to create the labeled training dataset.

In some embodiments, annotation system 402 may include a plurality of fonts 404. A vast number of fonts and typefaces are used in contemporary printed literature. To narrow down the task, fonts 404 may be limited to a subset of available fonts (e.g., a set of 10, 100, or other number of fonts) which cover a range of styles. These fonts display enough differentiation in visual attributes and typical use cases to cover the topics in the text samples. The annotation system 402 can also include a plurality of text samples 406. The text samples 406 may include a plurality of short text instances. In some embodiments, the text samples 406 include sample texts created by different designers and may cover a variety of topics, such as those found in posters, flyers, motivational quotes, advertisements, etc.

The annotation system 402 can render a text sample using some or all of the available fonts 404. These renderings can then be presented to annotators who are tasked to label each sample text by selecting their top three fonts. In some embodiments, annotators are asked to choose suitable fonts after reading the sentence. In some embodiments, quality assurance questions may be included as part of the annotation to ensure annotators selected fonts based on their comprehension of the text sample rather than just personal preference. Therefore, in some embodiments, the annotations of annotators who selected the same font more than a threshold value (e.g., 90 percent, or other high percentage, of the time, are removed. Experimentally, this task could be performed with nine annotators. In various embodiments, the task could be performed with more or fewer annotators. The results may then be pruned of any annotations from annotators who selected the same font too frequently. If this pruning results in any text sample instance being annotated by fewer than a threshold number of annotators, then the text sample instance may be removed from the set.

As discussed, annotators are asked to rank their top three font choices for each text sample, resulting in ranked samples 408 obtained from each annotator. In some embodiments, the first, second, and third choices are treated differently as they represent the annotators' priorities. Therefore, the highest weight is given to the first choices (1.0) and lower weights (0.6) and (0.3) to the second and third choices, respectively. By combining the results from all of the annotators, a font distribution is obtained for each text sample, producing labeled data 410. This labeled data can be divided into training dataset 302, validation dataset 412, and test dataset 414. The training dataset is then used as discussed above to train the font recommendation model. The font recommendation model is trained to learn to predict a font recommendation distribution for the training data text samples that mirrors the labeled distribution of the training dataset. As discussed, the validation dataset 412 may include labeled text samples that are reserved from training and used to validate performance of the model. Although this example is described with respect to choosing three fonts, in various embodiments more or fewer fonts may be used.

FIG. 5 illustrates an example of a font dataset in accordance with one or more embodiments. As discussed, fonts 404 may include a plurality of fonts that represent different styles. For example, in FIG. 5, seven different fonts are shown. However, the number of fonts included in the font dataset may include more or fewer fonts, depending on implementation. In the example of FIG. 5, each font is visualized using a text sample from the text sample dataset with the highest annotation agreement (e.g., the text sample that is most congruent with each font).

FIG. 6 illustrates an example of a text sample in different fonts for labeling in accordance with one or more embodiments. As discussed, the annotators may be presented with a text sample that has been rendered in multiple fonts. For example, as shown in FIG. 6, the text sample "Let's ring in the new year together!" is rendered in ten fonts F0-F9. Each annotator is then asked to rank the text samples based on which fonts are more congruent with the content of the text sample. In some embodiments, the annotator may rank a subset (e.g., a top 3, top 5, etc.) of the text sample instances, or may rank the entire list. Each annotator may be presented with each text sample rendered in each font.

Figure 7:
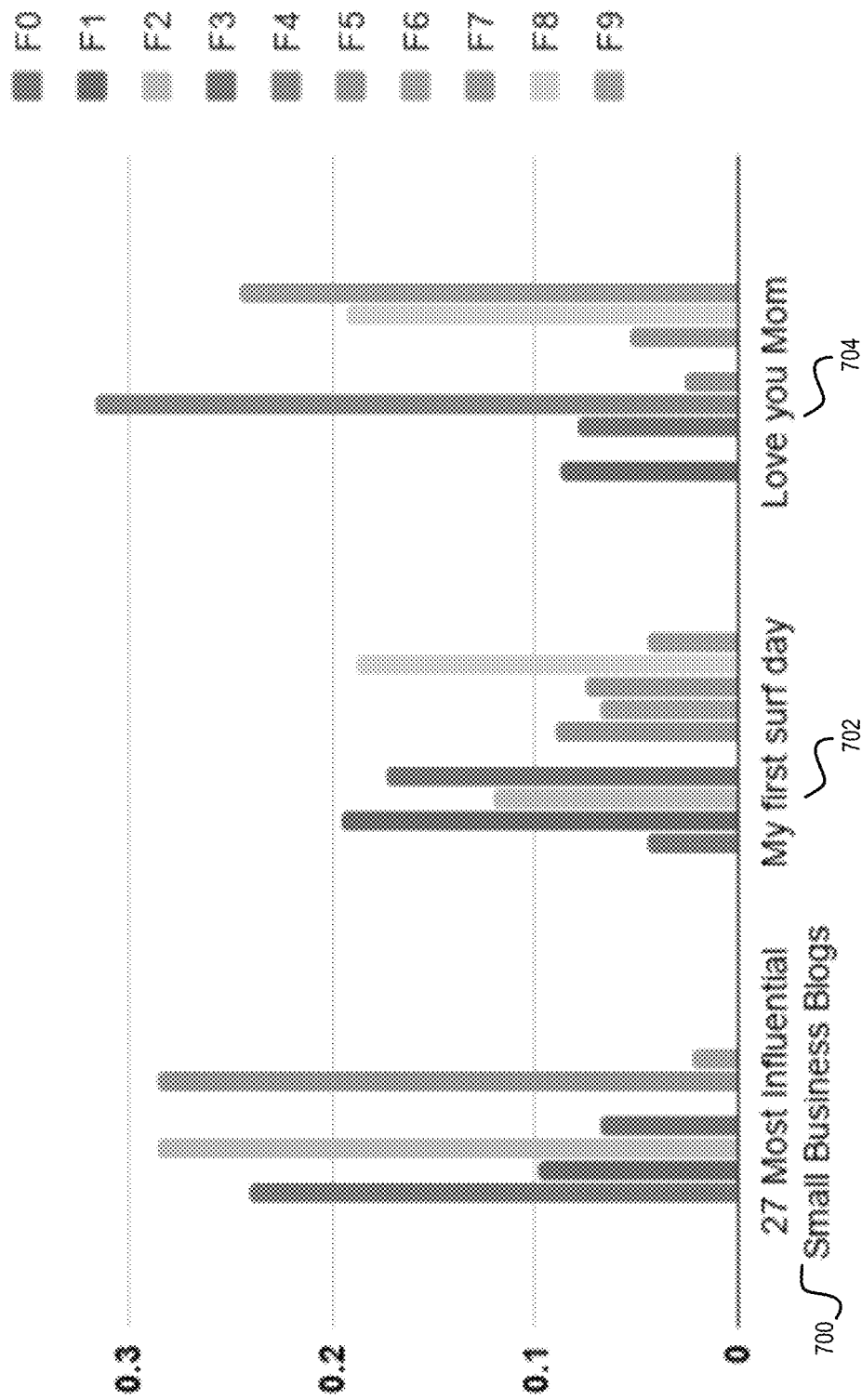
FIG. 7 illustrates an example of label distributions in accordance with one or more embodiments.

FIG. 7 illustrates an example of label distributions in accordance with one or more embodiments. In the example of FIG. 7, three examples 700-704 are shown with label distributions over ten fonts. By comparing the label distributions of these examples, it can be observed that 'formal' fonts like F0, F2, and F5 (e.g., corresponding to the fonts shown in FIG. 6) are often selected in business contexts, such as for text sample 700. Modern/display fonts like F1, F3, and F8 are favored in more casual settings, such as text sample 702. Additionally, script fonts like F4, F8, and F9 are preferred for more emotional contexts, as in text sample 704.

Figure 8:
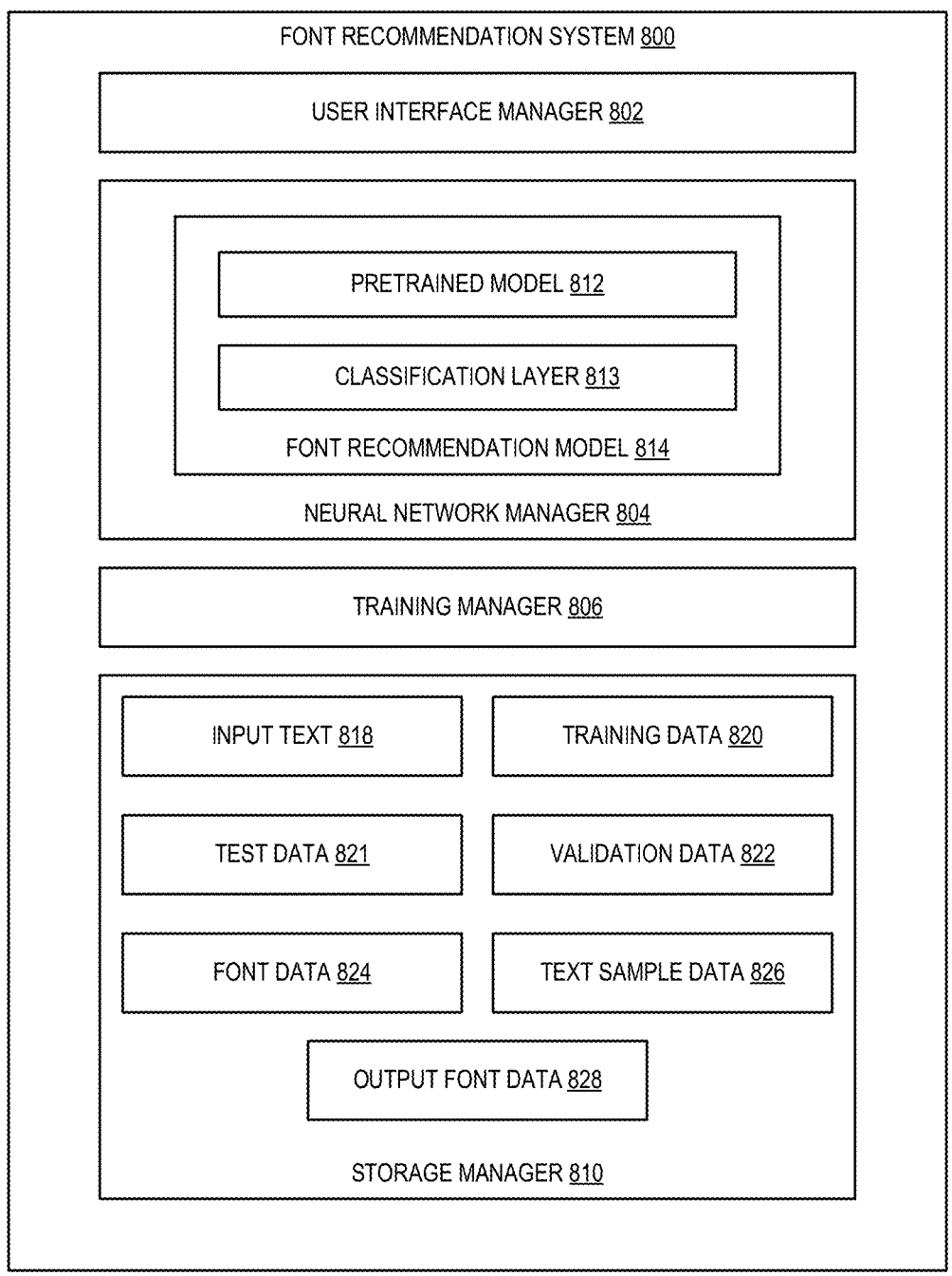
FIG. 8 illustrates a schematic diagram of a font recommendation system in accordance with one or more embodiments.

FIG. 8 illustrates a schematic diagram of font recommendation system (e.g., "font recommendation system" described above) in accordance with one or more embodiments. As shown, the font recommendation system 800 may include, but is not limited to, user interface manager 802, neural network manager 804, training manager 806, and storage manager 810. The neural network manager 804 includes a font recommendation model 814 which may include a pretrained model 812 and a classification layer 813. The storage manager 810 includes input text 818, training data 820, test data 821, validation data 822, font data 824, text sample data 826, and output font data 828.

As illustrated in FIG. 8, the font recommendation system 800 includes a user interface manager 802. For example, the user interface manager 802 allows users to select one or more text samples to be processed by the font recommendation system. In some embodiments, the user interface manager 802 enables a user to select one or more files which include input text 818 and are stored or accessible by storage manager 810. In some embodiments, the user interface manager 802 enables the user to select a specific portion of text (e.g., sentence, sentence fragment, paragraph, etc.) from the one or more files or from other text source. Additionally, the user interface manager 802 allows users to request the font recommendation system to recommend fonts for the input text. Further, the user interface manager 802 allows users to view the recommended fonts, select a font, and apply the font to the input text in the file or other text source. In some embodiments, font recommendation may be presented to the user via a user interface element managed by the user interface manager 802, such as a sidebar, pop-up window, or other visual element. In some embodiments, font recommendations may be provided automatically, without an explicit request from the user.

As further illustrated in FIG. 8, the font recommendation system 800 also includes the neural network manager 804 that includes font recommendation model 814, which may include a pretrained model 812 and a classification layer 813. As discussed, pretrained model 812 may be a neural network trained to generate a representation of the input text 818. For example, pretrained model may include a GloVe-BiLSTM Model, an NRC model, a BERT-based model, or an emoji model, as discussed above. The pretrained model receives the input text and outputs an embedding that represents the emotional content of the text. This embedding data enables the relationship between fonts and emotional content to be leveraged by the font recommendation model, yielding more accurate results.

Additionally, the font recommendation model may include classification layer 813 which may include one or more dense layers that output class predictions based on the embeddings received from the pretrained model 812 and/or the input text. As discussed, the font recommendation model 814 may be trained to learn to predict a font distribution associated with an input text. This distribution corresponds to a prediction for each class (e.g., font) that the font recommendation model has been trained to recommend. The font recommendation may be provided as output font data 828, which may include a ranked or unranked list of fonts which indicates each font's predicted probability of being congruent with the input text.

As further illustrated in FIG. 8, the font recommendation system 800 also includes training manager 806, which is configured to teach, guide, tune, and/or train one or more neural networks. In particular, the training manager 806 trains a neural network, such as font recommendation model 814, based on a plurality of training data (e.g., training data 820). In some embodiments, the training data used to train the font recommendation model includes any collection of text samples and corresponding font recommendations. For example, as discussed, a dataset of text samples may be obtained, the text samples including various kinds of text-based content. Each text sample may then be rendered in a plurality of fonts on which the font recommendation model is to be trained. The resulting text sample instances are then presented to annotators who rank the fonts based on how well the meaning, tone, emotion, etc. of the text sample appears to match the fonts. These ranks are combined and form a rank distribution associated with each text sample. This dataset can then be divided into training data 820, test data 821, and validation data 822. In some embodiments, the test data set and validation data set may be used to fine tune the trained model. In some embodiments, the test dataset may be used for the final evaluation.

As discussed, the training manager 806 can train the font recommendation model using the training data, validation data, and test data. For example, a training sample is obtained from the training data 820 and provided to the pretrained model. The pretrained model generates an embedding corresponding to the training sample which is then provided to the font recommendation model. The font recommendation model generates a font recommendation in the form of a class prediction for each of the fonts which it is being trained to recommend. This class prediction (e.g., the font distribution predicted by the model) is then compared to the ground truth font distribution associated with that text sample using a loss function (such as Kullback-Leibler Divergence) and the font recommendation model is trained end to end on the output of the loss function.

As illustrated in FIG. 8, the font recommendation system 800 also includes the storage manager 810. The storage manager 810 maintains data for the font recommendation system 800. The storage manager 810 can maintain data of any type, size, or kind as necessary to perform the functions of the font recommendation system 800. The storage manager 810, as shown in FIG. 8, includes input text 818. As discussed, input text 818 may include all or a portion of text data included in a file or other text source. Input text 818 may be obtained by the storage manager via a request from a user (e.g., where the user selects and explicitly provides the input text to the font recommendation system to receive a font recommendation) or automatically by reading the text from the file or source where it originates when it is accessed by the font recommendation system.

The storage manager 810, as shown in FIG. 8, also includes the training data 820. The training data 820 can include a plurality of text samples and corresponding font recommendation distributions, as discussed in additional detail above. In particular, in one or more embodiments, the training data 820 include text samples and corresponding font recommendation distributions utilized by the training manager 806 to train one or more neural networks to predict font recommendations for input text. The training data 820 may be labeled by annotators and compiled by an annotation system, which may be implemented as part of training manager 806 or as a separate system. The storage manager 810 may also include validation data 822, which may also include text samples and corresponding ground truth font recommendation distributions. Training data 820 and validation data 822 may be generated using the same techniques (e.g., via annotators), and the resulting labeled data may then be divided into training data and validation data. The validation data 822 may be used to verify the performance of the trained model after it has been trained using the training data.

As further illustrated in FIG. 8, the storage manager 810 also includes font data 824. Font data 824 may include the set of fonts which the font recommendation model is being trained to recommend. The set of fonts may be representative of a number of different types of fonts and may each have different appearances, properties, or other details. The storage manager 810 may also include text sample data 826. As discussed, the text sample data 826 may include various text snippets that are then rendered using the fonts 824 and presented to annotators to generate training data 820 and validation data 822. The storage manager 810 may also include output font data 828. The output font data 828 may include the class predictions output by the font recommendation model 814 for input text 818. In some embodiments, the output font data 828 may be ranked according to the class predictions. In some embodiments, the output font data 828 may include only a subset of the class predictions (e.g., only classes where the prediction was greater than a threshold value, etc.).

Embodiments described above outperform existing baseline techniques, as shown in Table 1, below.

TABLE 1

Experimental results using different Pretrained models

| Model | Evals | | | | |
|---|---|---|---|---|---|
| | FR Top3 | FR Top5 | F-Top1 | F-Top3 | F-Top5 |
| Majority Baseline | 30.00 | 50.00 | 12.44 | 43.72 | 62.24 |
| NRC Model | 30.78 | 51.60 | 23.10 | 47.27 | 66.16 |
| GloVe Model | 32.71 | 53.74 | 25.95 | 51.29 | 68.29 |
| Emoji Model | 33.17 | 54.06 | 26.00 | 51.43 | 68.53 |
| BERT Model | 33.54 | 56.00 | 26.97 | 51.91 | 69.38 |

Performance may be evaluated based on font (or class) recall (FR) and F-score. Less popular fonts could be underrepresented by the models. FR can be used as an evaluation metric that measures the performance of models in learning individual labels. Font Recall, e.g., the average recall per font, may be useful for unbalanced datasets to measure the performance of the models in learning individual labels.

$$FR := \frac{\sum_{i=1}^{|F|} |R_i|}{|F|}$$

Where |F| represents the number of labels and $R_i$ is the recall for the $i^{th}$ font.

Additionally, the F-score may be used to measure the performance of the models. For each instance X from the test set, the top k={1, 3 and 5} fonts with the highest probabilities are selected from both ground truth and prediction distributions. Then a weighted averaged F1-score for each k.

Note that there are many cases where two or more fonts have the exact same probability. In this case, if the model predicts either one of the labels, it is considered correct in both metrics.

Table 1, above, compares different models in terms of five evaluation settings. The first two columns of the results show FR for the top 3 and 5 fonts. The other three columns show F-score for the top 1, 3 and 5 fonts. In this example, the Majority Baseline uses the class(es) with the highest score(s) as the ground truth. Comparing to the Majority Baseline, the results from the Emoji and BERT models are statistically significant under paired t-test with 95% confidence interval. Although the BERT model performs slightly better than the rest, the Emoji model performs just as well, which suggests two things: (1) the font recommendation task is highly related to what emojis represent and 2) a simpler model like the emoji model can perform similarly to a complex solution like BERT. For example, BERT is a pre trained model based on Transformer architecture with more parameters, while the Emoji model is based on BiLSTM architecture with a relatively lower number of parameters.

Each of the components 802-810 of the font recommendation system 800 and their corresponding elements (as shown in FIG. 8) may be in communication with one another using any suitable communication technologies. It will be recognized that although components 802-810 and their corresponding elements are shown to be separate in FIG. 8, any of components 802-810 and their corresponding elements may be combined into fewer components, such as into a single facility or module, divided into more components, or configured into different components as may serve a particular embodiment.

The components 802-810 and their corresponding elements can comprise software, hardware, or both. For example, the components 802-810 and their corresponding elements can comprise one or more instructions stored on a computer-readable storage medium and executable by processors of one or more computing devices. When executed by the one or more processors, the computer-executable instructions of the font recommendation system 800 can cause a client device and/or a server device to perform the methods described herein. Alternatively, the components 802-810 and their corresponding elements can comprise hardware, such as a special purpose processing device to perform a certain function or group of functions. Additionally, the components 802-810 and their corresponding elements can comprise a combination of computer-executable instructions and hardware.

Furthermore, the components 802-810 of the font recommendation system 800 may, for example, be implemented as one or more stand-alone applications, as one or more modules of an application, as one or more plug-ins, as one or more library functions or functions that may be called by other applications, and/or as a cloud-computing model. Thus, the components 802-810 of the font recommendation system 800 may be implemented as a stand-alone application, such as a desktop or mobile application. Furthermore, the components 802-810 of the font recommendation system 800 may be implemented as one or more web-based applications hosted on a remote server. Alternatively, or additionally, the components of the font recommendation system 800 may be implemented in a suit of mobile device applications or "apps." To illustrate, the components of the font recommendation system 800 may be implemented in a document management application, image processing application, or cloud-based suite of applications, including but not limited to ADOBE CREATIVE CLOUD, ADOBE PHOTOSHOP, ADOBE ACROBAT, ADOBE ILLUSTRATOR, ADOBE LIGHTROOM and ADOBE INDESIGN. "ADOBE", "CREATIVE CLOUD," "PHOTOSHOP," "ACROBAT," "ILLUSTRATOR," "LIGHTROOM," and "INDESIGN" are either registered trademarks or trademarks of Adobe Inc. in the United States and/or other countries.

Figure 9:
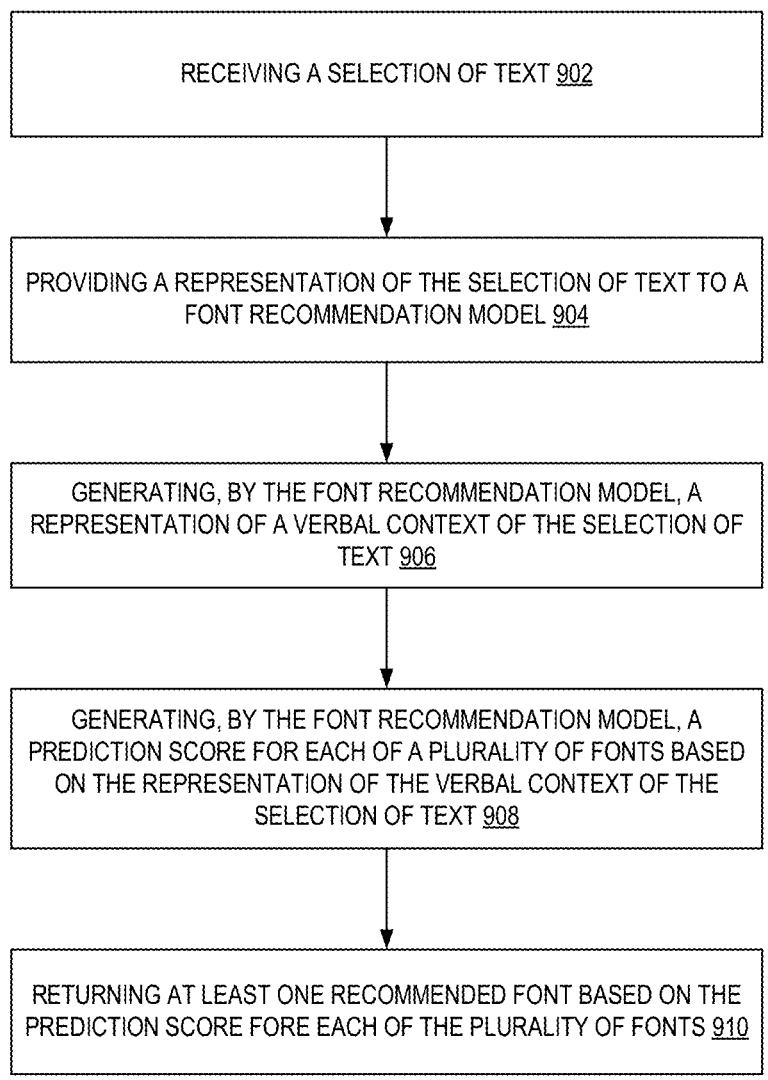
FIG. 9 illustrates a flowchart of a series of acts in a method of font recommendation from text in accordance with one or more embodiments.

FIGS. 1-8, the corresponding text, and the examples, provide a number of different systems and devices that allows a user to facilitate selection of target individuals within digital visual media. In addition to the foregoing, embodiments can also be described in terms of flowcharts comprising acts and steps in a method for accomplishing a particular result. For example, FIG. 9 illustrates a flowchart of an exemplary method in accordance with one or more embodiments. The method described in relation to FIG. 9 may be performed with fewer or more steps/acts or the steps/acts may be performed in differing orders. Additionally, the steps/acts described herein may be repeated or performed in parallel with one another or in parallel with different instances of the same or similar steps/acts.

FIG. 9 illustrates a flowchart 900 of a series of acts in a method of font recommendation from text in accordance with one or more embodiments. In one or more embodiments, the method 900 is performed in a digital medium environment that includes the font recommendation system 100. The method 900 is intended to be illustrative of one or more methods in accordance with the present disclosure and is not intended to limit potential embodiments. Alternative embodiments can include additional, fewer, or different steps than those articulated in FIG. 9.

As illustrated in FIG. 9, the method 900 includes an act 902 of receiving a selection of text. For example, the user may select all or a portion of text in an electronic document, such as a file, or from another text source. In some embodiments, the font recommendation system may be implemented in a document management application and the user may be recommended fonts as they compose a document. In some embodiments, the user may enter or select the selection of text via a keyboard or other input device.

As illustrated in FIG. 9, the method 900 includes an act 904 of providing a representation of the selection of text to a font recommendation model. In some embodiments, the method further includes providing the selection of text to a pretrained model, wherein the pretrained model is pretrained to generate the representation of the verbal context of the selection of text. The pretrained model may be a transformer-based model, and wherein the representation of the verbal context of the selection of text is a contextual embedding. For example, the pretrained model may be a Bidirectional Encoder Representations from Transformers (BERT) model, and wherein the representation of the selection of text is a contextual embedding. For example, the BERT model may be a pretrained BERT sequence classification model can be used to obtain contextual embeddings which encode the verbal context of the selection of text as features. Alternatively, the pretrained model may be an emoji model which encodes the verbal context of the selection of text into the representation of the verbal context of the selection of text, wherein the representation of the verbal context of the selection of text is an emoji vector. For example, a pretrained Deep-Moji model can generate emoji vectors by encoding the text into feature vectors (e.g., 2304-dimensional feature vectors). These feature vectors may be treated as embeddings and then passed to the font representation model. In some embodiments, the font recommendation model includes a plurality of dense layers which receive the representation of the selection of text and output the prediction score for each of the plurality of fonts, wherein the prediction score is a class prediction.

As illustrated in FIG. 9, the method 900 includes an act 906 of generating, by the font recommendation model, a representation of a verbal context of the selection of text. As discussed, the verbal context may include the emotion conveyed by the text, the perceived tone of the text, the sentiment of the text, or other information that is inferred from the text itself which affects how the text is understood as may be identified using various natural language understanding techniques. For example, as discussed, a transformer-based model may encode the verbal context of the selection of text as contextual embeddings, which are then used to identify fonts that are likely congruent with the verbal context. Alternatively, an emoji model may be used to generate an emotional embedding, such as an emoji vector representation, that represents the verbal context of the selection of text, and which may be used to identify fonts that are likely congruent with the verbal context.

As illustrated in FIG. 9, the method 900 includes an act 908 of generating, by the font recommendation model, a prediction score for each of a plurality of fonts based on the representation of the verbal context of the selection of text. For example, the font recommendation model may include one or more dense layers yielding the class predictions. The classes correspond to the fonts which may be recommended based on the text.

As illustrated in FIG. 9, the method 900 includes an act 910 of returning at least one recommended font based on the prediction score for each of the plurality of fonts. In some embodiments, the method further includes applying the at least one recommended font to the selection of text. For example, the user may select from among the recommended fonts which causes the selected font to be applied to the text. In some embodiments, returning the at least one recommended font may further include returning a list of the plurality of fonts, wherein the list of the plurality of fonts is ranked according to each font's corresponding prediction score.

In some embodiments, the font recommendation model is trained by a training system, wherein the training system is configured to obtain training data including a plurality of training text samples and a corresponding plurality of ground truth font distributions and train the font recommendation model to predict a distribution of suggested fonts using a loss function to compare a predicted distribution output by the font recommendation model to a corresponding ground truth font distribution.

Figure 10:
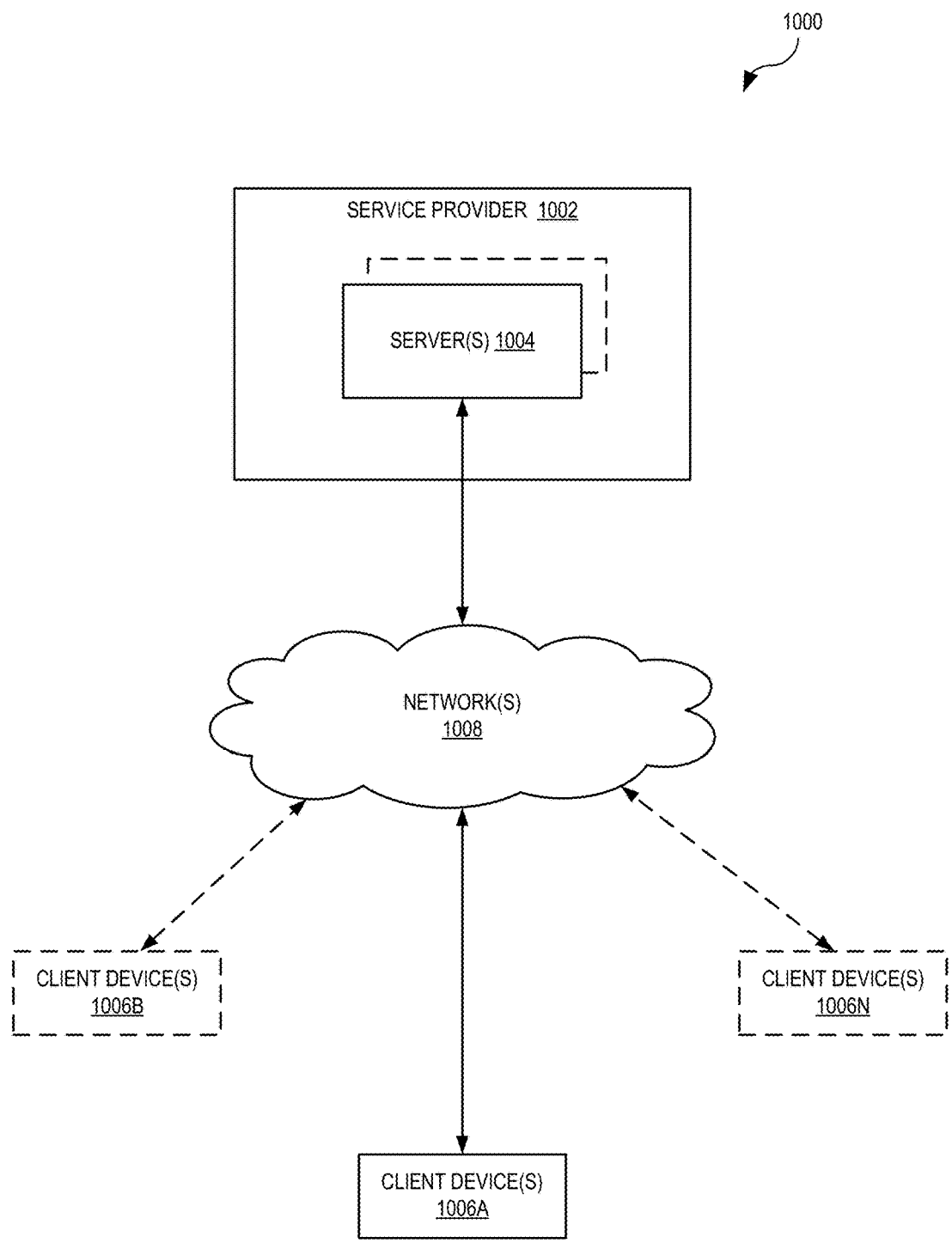
FIG. 10 illustrates a schematic diagram of an exemplary environment in which the image processing system can operate in accordance with one or more embodiments.

FIG. 10 illustrates a schematic diagram of an exemplary environment 1000 in which the font recommendation system 800 can operate in accordance with one or more embodiments. In one or more embodiments, the environment 1000 includes a service provider 1002 which may include one or more servers 1004 connected to a plurality of client devices 1006A-1006N via one or more networks 1008. The client devices 1006A-1006N, the one or more networks 1008, the service provider 1002, and the one or more servers 1004 may communicate with each other or other components using any communication platforms and technologies suitable for transporting data and/or communication signals, including any known communication technologies, devices, media, and protocols supportive of remote data communications, examples of which will be described in more detail below with respect to FIG. 11.

Although FIG. 10 illustrates a particular arrangement of the client devices 1006A-1006N, the one or more networks 1008, the service provider 1002, and the one or more servers 1004, various additional arrangements are possible. For example, the client devices 1006A-1006N may directly communicate with the one or more servers 1004, bypassing the network 1008. Or alternatively, the client devices 1006A-1006N may directly communicate with each other. The service provider 1002 may be a public cloud service provider which owns and operates their own infrastructure in one or more data centers and provides this infrastructure to customers and end users on demand to host applications on the one or more servers 1004. The servers may include one or more hardware servers (e.g., hosts), each with its own computing resources (e.g., processors, memory, disk space, networking bandwidth, etc.) which may be securely divided between multiple customers, each of which may host their own applications on the one or more servers 1004. In some embodiments, the service provider may be a private cloud provider which maintains cloud infrastructure for a single organization. The one or more servers 1004 may similarly include one or more hardware servers, each with its own computing resources, which are divided among applications hosted by the one or more servers for use by members of the organization or their customers.

Similarly, although the environment 1000 of FIG. 10 is depicted as having various components, the environment 1000 may have additional or alternative components. For example, the environment 1000 can be implemented on a single computing device with the font recommendation system 800. In particular, the font recommendation system 800 may be implemented in whole or in part on the client device 1002A.

As illustrated in FIG. 10, the environment 1000 may include client devices 1006A-1006N. The client devices 1006A-1006N may comprise any computing device. For example, client devices 1006A-1006N may comprise one or more personal computers, laptop computers, mobile devices, mobile phones, tablets, special purpose computers, TVs, or other computing devices, including computing devices described below with regard to FIG. 11. Although three client devices are shown in FIG. 10, it will be appreciated that client devices 1006A-1006N may comprise any number of client devices (greater or smaller than shown).

Moreover, as illustrated in FIG. 10, the client devices 1006A-1006N and the one or more servers 1004 may communicate via one or more networks 1008. The one or more networks 1008 may represent a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the one or more networks 1008 may be any suitable network over which the client devices 1006A-1006N may access service provider 1002 and server 1004, or vice versa. The one or more networks 1008 will be discussed in more detail below with regard to FIG. 11.

In addition, the environment 1000 may also include one or more servers 1004. The one or more servers 1004 may generate, store, receive, and transmit any type of data, including input text 818, training data 820, validation data 822, font data 824, text sample data 826, output font data 828, or other information. For example, a server 1004 may receive data from a client device, such as the client device 1006A, and send the data to another client device, such as the client device 1002B and/or 1002N. The server 1004 can also transmit electronic messages between one or more users of the environment 1000. In one example embodiment, the server 1004 is a data server. The server 1004 can also comprise a communication server or a web-hosting server. Additional details regarding the server 1004 will be discussed below with respect to FIG. 11.

As mentioned, in one or more embodiments, the one or more servers 1004 can include or implement at least a portion of the font recommendation system 800. In particular, the font recommendation system 800 can comprise an application running on the one or more servers 1004 or a portion of the font recommendation system 800 can be downloaded from the one or more servers 1004. For example, the font recommendation system 800 can include a web hosting application that allows the client devices 1006A-1006N to interact with content hosted at the one or more servers 1004. To illustrate, in one or more embodiments of the environment 1000, one or more client devices 1006A-1006N can access a webpage supported by the one or more servers 1004. In particular, the client device 1006A can run a web application (e.g., a web browser) to allow a user to access, view, and/or interact with a webpage or website hosted at the one or more servers 1004.

Upon the client device 1006A accessing a webpage or other web application hosted at the one or more servers 1004, in one or more embodiments, the one or more servers 1004 can provide access to one or more files or other sources of text stored at the one or more servers 1004. Moreover, the client device 1006A can receive a request (i.e., via user input) to recommend fonts for an input text sample (e.g., selected from the one or more files or other sources of text) and provide the request to the one or more servers 1004. Upon receiving the request, the one or more servers 1004 can automatically perform the methods and processes described above to recommend fonts. The one or more servers 1004 can provide the font recommendations, automatically apply the fonts to the text sample, etc., to the client device 1006A for display to the user.

As just described, the font recommendation system 800 may be implemented in whole, or in part, by the individual elements 1002-1008 of the environment 1000. It will be appreciated that although certain components of the font recommendation system 800 are described in the previous examples with regard to particular elements of the environment 1000, various alternative implementations are possible. For instance, in one or more embodiments, the font recommendation system 800 is implemented on any of the client devices 1006A-N. Similarly, in one or more embodiments, the font recommendation system 800 may be implemented on the one or more servers 1004. Moreover, different components and functions of the font recommendation system 800 may be implemented separately among client devices 1006A-1006N, the one or more servers 1004, and the network 1008.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
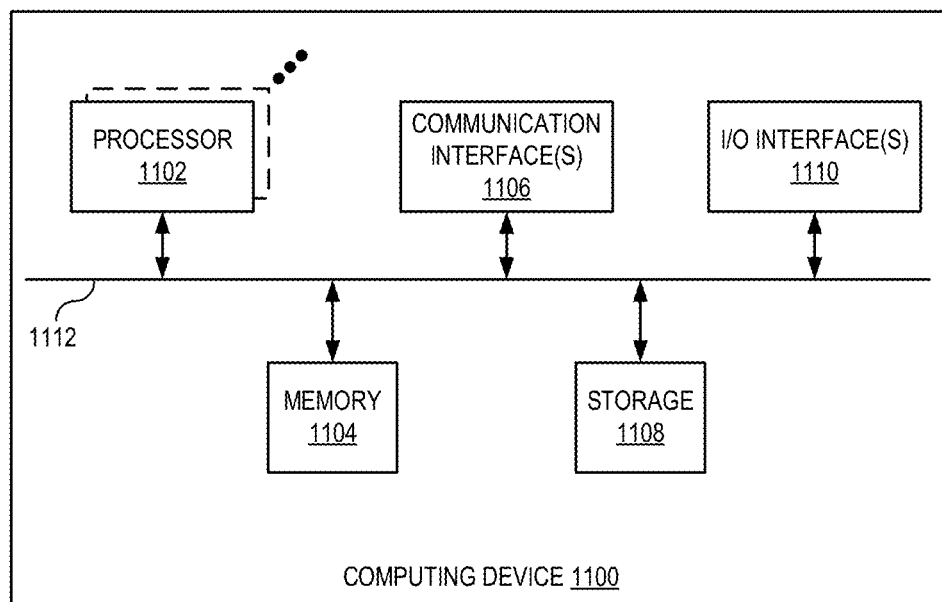
FIG. 11 illustrates a block diagram of an exemplary computing device in accordance with one or more embodiments.

FIG. 11 illustrates, in block diagram form, an exemplary computing device 1100 that may be configured to perform one or more of the processes described above. One will appreciate that one or more computing devices such as the computing device 1100 may implement the image processing system. As shown by FIG. 11, the computing device can comprise a processor 1102, memory 1104, one or more communication interfaces 1106, a storage device 1108, and one or more I/O devices/interfaces 1110. In certain embodiments, the computing device 1100 can include fewer or more components than those shown in FIG. 11. Components of computing device 1100 shown in FIG. 11 will now be described in additional detail.

In particular embodiments, processor(s) 1102 includes hardware for executing instructions, such as those making up a computer program. As an example, and not by way of limitation, to execute instructions, processor(s) 1102 may retrieve (or fetch) the instructions from an internal register, an internal cache, memory 1104, or a storage device 1108 and decode and execute them. In various embodiments, the processor(s) 1102 may include one or more central processing units (CPUs), graphics processing units (GPUs), field programmable gate arrays (FPGAs), systems on chip (SoC), or other processor(s) or combinations of processors.

The computing device 1100 includes memory 1104, which is coupled to the processor(s) 1102. The memory 1104 may be used for storing data, metadata, and programs for execution by the processor(s). The memory 1104 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1104 may be internal or distributed memory.

The computing device 1100 can further include one or more communication interfaces 1106. A communication interface 1106 can include hardware, software, or both. The communication interface 1106 can provide one or more interfaces for communication (such as, for example, packet-based communication) between the computing device and one or more other computing devices 1100 or one or more networks. As an example and not by way of limitation, communication interface 1106 may include a network interface controller (NIC) or network adapter for communicating with an Ethernet or other wire-based network or a wireless NIC (WNIC) or wireless adapter for communicating with a wireless network, such as a WI-FI. The computing device 1100 can further include a bus 1112. The bus 1112 can comprise hardware, software, or both that couples components of computing device 1100 to each other.

The computing device 1100 includes a storage device 1108 includes storage for storing data or instructions. As an example, and not by way of limitation, storage device 1108 can comprise a non-transitory storage medium described above. The storage device 1108 may include a hard disk drive (HDD), flash memory, a Universal Serial Bus (USB) drive or a combination these or other storage devices. The computing device 1100 also includes one or more input or output ("I/O") devices/interfaces 1110, which are provided to allow a user to provide input to (such as user strokes), receive output from, and otherwise transfer data to and from the computing device 1100. These I/O devices/interfaces 1110 may include a mouse, keypad or a keyboard, a touch screen, camera, optical scanner, network interface, modem, other known I/O devices or a combination of such I/O devices/interfaces 1110. The touch screen may be activated with a stylus or a finger.

The I/O devices/interfaces 1110 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 1110 is configured to provide graphical data to a display for presentation to a user. The graphical data may be representative of one or more graphical user interfaces and/or any other graphical content as may serve a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments may include other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

We claim:

1. A computer-implemented method comprising:
receiving a selection of text;
providing the selection of text to a font recommendation model trained to predict a font recommendation by learning associations between visual attributes of a plurality of font types and verbal contexts of training texts;
generating, by the font recommendation model, an embedding representing a verbal context of the selection of text, the verbal context of the selection of text including emotions conveyed by the selection of text;
generating, by the font recommendation model, a prediction score for each of the plurality of font types based on the embedding representing the verbal context of the selection of text, wherein each prediction score is based on a relationship between visual attributes of a corresponding font type and the emotions conveyed by the selection of text, wherein a higher prediction score for a font type indicates greater congruency between the font type and the emotions conveyed by the selection of text; and
returning at least one recommended font type based on the prediction score for each of the plurality of font types.

2. The computer-implemented method of claim 1, wherein providing the selection of text to a font recommendation model further comprises:
providing the selection of text to a pretrained model, wherein the pretrained model is pretrained to generate the embedding representing the verbal context of the selection of text.

3. The computer-implemented method of claim 2, wherein the pretrained model is an emoji model which encodes the verbal context of the selection of text into the embedding representing the verbal context of the selection of text, wherein the embedding representing the verbal context of the selection of text is an emoji vector.

4. The computer-implemented method of claim 2, wherein the pretrained model is a transformer-based model that generates the embedding representing the verbal context of the selection of text, and wherein the embedding representing the verbal context of the selection of text is a contextual embedding.

5. The computer-implemented method of claim 1, wherein the font recommendation model includes a pretrained model and one or more dense layers which receive the selection of text and output the prediction score for each of the plurality of font types, wherein the prediction score is a class prediction.

6. The computer-implemented method of claim 1, wherein returning at least one recommended font type based on the prediction score for each of the plurality of font types further comprises:
returning a list of the plurality of font types, wherein the list of the plurality of font types is ranked according to each font type's corresponding prediction score.

7. The computer-implemented method of claim 1, further comprising:
applying the at least one recommended font type to the selection of text.

8. The computer-implemented method of claim 1, wherein the font recommendation model is trained by a training system, wherein the training system is configured to:
obtain training data including a plurality of training text samples and a corresponding plurality of ground truth font distributions; and
train the font recommendation model to predict a distribution of suggested font types using a loss function to compare a predicted distribution output by the font recommendation model to a corresponding ground truth font distribution.

9. A non-transitory computer readable storage medium including instructions stored thereon which, when executed by a processor, cause the processor to:
receive a selection of text;
provide a representation of the selection of text to a font recommendation model trained to predict a font recommendation by learning associations between visual attributes of a plurality of font types and verbal contexts of training texts;
generate, by the font recommendation model, an embedding representing a verbal context of the selection of text, the verbal context of the selection of text including emotions conveyed by the selection of text;
generate, by the font recommendation model, a prediction score for each of the plurality of font types based on the embedding representing the verbal context of the selection of text, wherein each prediction score is based on a relationship between visual attributes of a corresponding font type and the emotions conveyed by the selection of text, wherein a higher prediction score for a font type indicates greater congruency between the font type and the emotions conveyed by the selection of text; and
return at least one recommended font type based on the prediction score for each of the plurality of font types.

10. The non-transitory computer readable storage medium of claim 9, wherein the instructions, when executed by the processor, further cause the processor to:
provide the selection of text to a pretrained model, wherein the pretrained model is pretrained to generate the embedding representing the verbal context of the selection of text.

11. The non-transitory computer readable storage medium of claim 10, wherein the pretrained model is an emoji model which encodes the verbal context of the selection of text into the embedding representing the verbal context of the selection of text, wherein the embedding representing the verbal context of the selection of text is an emoji vector.

12. The non-transitory computer readable storage medium of claim 10, wherein the pretrained model is a transformer-based model that generates the embedding representing the verbal context of the selection of text, and wherein the embedding representing the verbal context of the selection of text is a contextual embedding.

13. The non-transitory computer readable storage medium of claim 9, wherein the font recommendation model includes a plurality of dense layers which receive the representation of the selection of text and output the prediction score for each of the plurality of font types, wherein the prediction score is a class prediction.

14. The non-transitory computer readable storage medium of claim 9, wherein the instructions to return at least one recommended font type based on the prediction score for each of the plurality of font types, when executed by the processor, further cause the processor to:

return a list of the plurality of font types, wherein the list of the plurality of font types is ranked according to each font type's corresponding prediction score.

15. The non-transitory computer readable storage medium of claim 9, wherein the instructions, when executed by the processor, further cause the processor to:

apply the at least one recommended font type to the selection of text.

16. A system, comprising:

at least one electronic device implementing a font recommendation system, the at least one electronic device including instructions stored thereon which, when executed by a processor, cause the font recommendation system to:

receive a selection of text;

provide a representation of the selection of text to a font recommendation model trained to predict a font recommendation by learning associations between visual attributes of a plurality of font types and verbal contexts of training texts;

generate, by the font recommendation model, an embedding representing a verbal context of the selection of text, the verbal context of the selection of text including emotions conveyed by the selection of text;

generate, by the font recommendation model, a prediction score for each of the plurality of font types based on the embedding representing the verbal context of the selection of text, wherein each prediction score is based on a relationship between visual attributes of a corresponding font type and the emotions conveyed by the selection of text, wherein a higher prediction score for a font type indicates greater congruency between the font type and the emotions conveyed by the selection of text; and return at least one recommended font type based on the prediction score for each of the plurality of font types.

17. The system of claim 16, wherein the instructions, when executed by the processor, further cause the font recommendation system to:

provide the selection of text to a pretrained model, wherein the pretrained model is pretrained to generate the embedding representing the verbal context of the selection of text.

18. The system of claim 17, wherein the pretrained model is an emoji model which encodes the verbal context of the selection of text into the embedding representing the verbal context of the selection of text, wherein the embedding representing the verbal context of the selection of text is an emoji vector.

19. The system of claim 17, wherein the pretrained model is a transformer-based model that generates the embedding representing the verbal context of the selection of text, and wherein the embedding representing the verbal context of the selection of text is a contextual embedding.

20. The system of claim 16, wherein the font recommendation model includes a plurality of dense layers which receive the representation of the selection of text and output the prediction score for each of the plurality of font types, wherein the prediction score is a class prediction.

* * * * *